United States Patent
Troyan et al.

(10) Patent No.: US 10,678,657 B1
(45) Date of Patent: Jun. 9, 2020

(54) REVERSION OPERATIONS FOR VIRTUAL COMPUTING ENVIRONMENTS

(71) Applicant: Amazon Technologies, Inc., Seattle, WA (US)

(72) Inventors: Gregory Vitaly Troyan, Bainbridge Island, WA (US); David Arthur Stanford, Jr., Snoqualmie, WA (US); Gregory Bevan McConnel, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/104,441

(22) Filed: Aug. 17, 2018

Related U.S. Application Data

(63) Continuation of application No. 14/849,419, filed on Sep. 9, 2015, now Pat. No. 10,055,311.

(51) Int. Cl.
G06F 11/00 (2006.01)
G06F 11/14 (2006.01)

(52) U.S. Cl.
CPC ...... *G06F 11/1469* (2013.01); *G06F 11/1451* (2013.01); *G06F 2201/84* (2013.01)

(58) Field of Classification Search
CPC .................... G06F 11/1469; G06F 11/1451
See application file for complete search history.

(56) References Cited

U.S. PATENT DOCUMENTS

| | | | | |
|---|---|---|---|---|
| 8,819,369 B1* | 8/2014 | Alappat | ............. | G06F 9/45558 711/162 |
| 10,055,311 B1* | 8/2018 | Troyan | ................ | G06F 11/1438 |
| 10,372,555 B1* | 8/2019 | Troyan | .................... | G06F 16/27 |
| 2015/0378870 A1* | 12/2015 | Marron | ................ | G06F 11/362 717/128 |
| 2016/0077900 A1* | 3/2016 | Wada | .................. | G06F 9/44505 719/318 |

* cited by examiner

*Primary Examiner* — Philip Guyton
(74) *Attorney, Agent, or Firm* — Thorpe North & Western, LLP.

(57) ABSTRACT

A technology is provided for enabling a virtual computing environment to be changed to a reversion state approximating an earlier state is provided. The customer may create, organize, and change virtual computing resources within the virtual computing environment. The customer may also realize that recent desired changes made to the virtual computing environment have disrupted functionality that previously worked before the desired changes were made. A reversion service may be provided that allows the virtual computing environment to be changed to a reversion state approximating a state that preceded the changes without violating system rules, protocols, or limitations to which the virtual computing environment might be subject.

20 Claims, 12 Drawing Sheets

500

| | Change | User | Time | Reversion Options | Reversion Constraints |
|---|---|---|---|---|---|
| 512 | Subnet XYZ deleted | JUST4U2C | 6/29/2015 7:46:80 PM | A clone of subnet XYZ can be created | |
| 514 | Computing Instance 00001 created | JUST4U2C | 6/29/2015 10:27:03 PM | Computing Instance 00001 can be deleted | |
| 516 | Data Store 00033 deleted | I8AΠ | 7/1/2015 6:12:19 AM | A clone of Data Store 00033 can be created | A clone may not include any encrypted volumes that were in Data Store 00033

A clone may not have the same ID number of the original instance, but the clone's ID may be mapped to the same ID as an alias |
| 518 | Security Group ABC created | CUL8R | 7/1/2015 6:13:56 AM | Security Group ABC can be deleted | If a security group is deleted, remaining computing resources that formerly belonged to the security group may lose firewall benefits provided by the deleted security group |
| 520 | Computing Instance 00001 added to Security Group ABC | CUL8R | 7/1/2015 6:15:99 AM | Computing Instance 00001 can be removed from Security Group ABC | Computing Instances that are removed from a security group may lose firewall benefits provided by the security group |
| 522 | Computing Instance 00003 deleted | XLR8 | 7/1/2015 6:20:76 AM | A clone of Computing Instance 00003 can be created | A clone may not have the same ID number of the original instance, but the clone's ID number may be mapped to the same ID number as an alias |

FIG. 5

REVERSION OPERATIONS FOR VIRTUAL COMPUTING ENVIRONMENTS

This application is a Continuation of U.S. patent application Ser. No. 14/849,419, filed on Sep. 9, 2015, which is incorporated herein by reference.

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Within a virtualized service provider environment, multiple computing instances, data store objects, and other virtualized objects may exist. These various instances and objects may be organized into private networks and subnetworks and into groups that share certain security characteristics. These instances and objects may interact with one another within the virtualized service provider environment in various ways depending on how the service provider environment is designed.

A virtualized computing environment may be made available to a customer (e.g., a person or a business) through a service provider that provides virtualization technologies for computing resources. The customer may have a customer account with the service provider and may have a customer environment associated with the customer account. The customer (e.g., the customer's agents, who may have multiple sub-accounts associated with the customer account) may be able to create, organize, and modify the customer environment to meet the customer's needs. The customer may, for example, launch virtual computing resources (e.g., computing instances, data store instances, or applications) within the customer environment.

BRIEF DESCRIPTION OF THE DRAWINGS

FIG. 5 illustrates a table of information that may be sent to advise a customer of limitations that may apply to a reversion service in accordance with an example;

DETAILED DESCRIPTION

Figure 1:
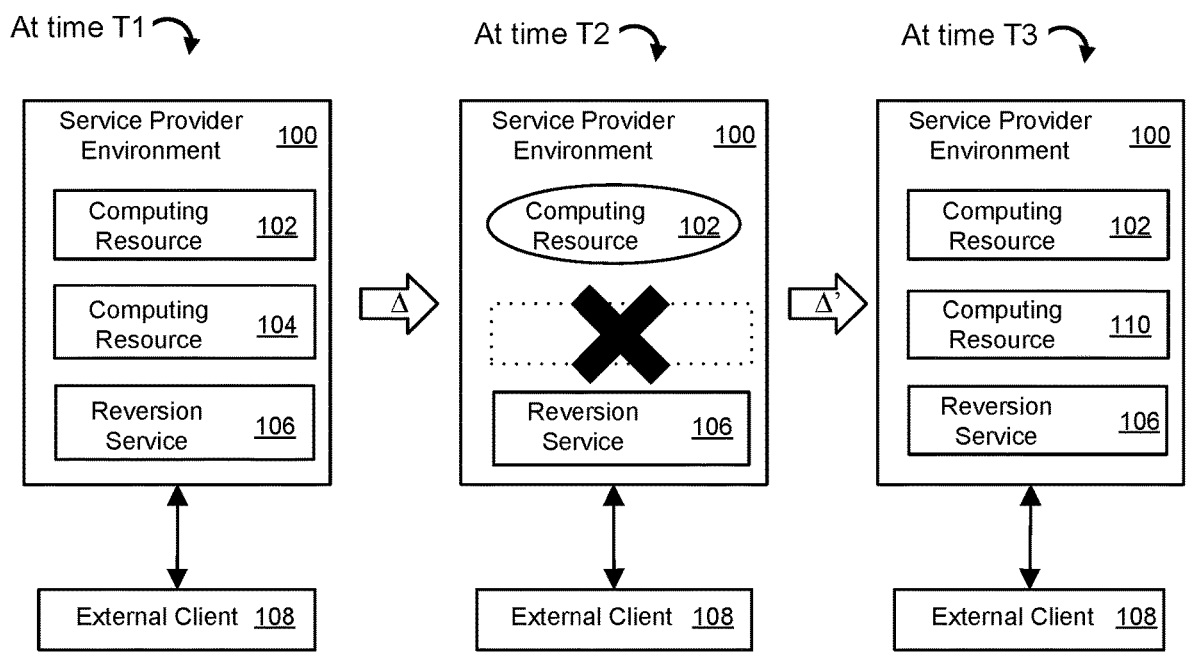
FIG. 1 is a diagram illustrating a sequence of states that may occur within a service provider environment that includes a reversion service in accordance with an example.

A technology is provided to enable changes that have been implemented on a virtualized customer environment within a service provider environment to be reverted so that the customer environment is returned to an earlier state. In a service provider environment, the customer may change: the organization of the customer environment, the number of computing resources used, the types of computing resources used, and the configurations of the computing resources used (as the customer's needs change). Occasionally, the customer may wish to revert back to a previous state of the customer environment after changes have been made. Similarly, a customer may desire to have one or more computing objects or computing resources in the customer environment revert back to a previous state.

For example, a customer may discover that a recent change made to the customer environment has caused some computing instance, data store, service, process, networking configurations, security settings, or other functionality that worked properly in the previous state to stop working. This scenario may occur especially in complex computing environments where there may be many subtle dependencies or interactions that exist between various computing resources such as software applications, services, and similar computing objects or computing resources that operate within a customer environment. In such complex computing environments, changing one computing resource or changing some aspect of the customer environment may cause unintended effects. Thus, the customer may wish to revert the computing environment back to a previous state in order to restore previously operational functionality that was lost after a recent change was made.

Examples of the disclosed technology may allow a customer environment to be reverted to a previous state or, in cases where the previous state cannot be fully restored, to be changed to a state that approximates the previous state without violating protocols or other limitations to which the customer environment is subjected by the service provider. In cases where the customer environment cannot be completely restored to the previous state, the customer can be presented with an analysis that identifies aspects of the previous state that would not be restored by available reversion operations.

Reversion to a previous state may be performed by executing commands in the customer environment that are the inverse of the operations that made the initial change to a computing resource in a customer environment. For example, API (application programming interface) calls may be used that revert the changes or apply the inverse operations as compared to the API calls that made changes. In a similar example, scripts or other listings of actions may be used to revert the customer environment and computing objects within the customer environment to a previous state that existed before changes were made. In another example of reversion, a deletion of a computing instance may be reversed by creating a restored computing instance from a stored image of the deleted computing instance. Similarly, a new computing instance may be created to replace a deleted computing instance and previously captured configuration information may be applied to the new computing instance to match or approximate the state of the new computing instance to the deleted computing instance. As a further example, a new computing instance may replace a deleted computing instance without any additional configurations being applied.

Reverting a customer environment to a previous state may, however, pose some difficulty for a number of reasons. A computing resource within the customer environment may, for example, be assigned a unique identifier. If the computing resource is deleted, the service provider's protocols may prohibit a newly created computing resource from taking on the same unique identifier as the deleted computing resource, even if the new computing resource is intended to replace the deleted computing resource. In another example, if an encrypted volume of data is deleted from the computing environment, the service provider's protocols may prohibit restoring the encrypted volume of data because of security concerns involving verification of data deletion. In another example, if a secure shell (SSH) key associated with a customer account is deleted, the SSH key may be permanently lost.

FIG. 1 is a diagram illustrating a sequence of states that may occur within a service provider environment 100 in accordance with an example. As shown at a first time (T1), the service provider environment 100 may be in an initial state where computing resources 102, 104 (e.g., computing instances, data store instances, or applications) and a reversion service 106 are operating within the service provider environment 100. A command may be received at the service provider environment 100 from an external client 108 (e.g., via an API (application programming interface)) requesting that the computing resource 104 be deleted. Another command may be received at the service provider environment 100 from the external client 108 requesting that an initial configuration of the second computing resource 102 be changed. For example, the configuration of a computing instance or block storage volume may be changed through API commands.

As illustrated at a second time T2, the service provider 100 may then delete the first computing resource 104 and change the configuration of the second computing resource 102 to a modified configuration in response to the request (depicted by the change in shape of the second computing resource 102 to an oval). As a result of the deletion and the configuration change, the service provider environment 100 may be changed to a modified state shown at the second time (T2).

A command to revert to the initial state may then be received at the service environment 100 from the external client 108 or another source. In response, the reversion service 106 may initiate a change of the computing resource 102 from the modified configuration shown at T2 back to the initial configuration of T1 (depicted by the change in shape of the second computing resource 102 back to a rectangle). The reversion service 106 may also create (i.e., launch) a new computing resource 110 that serves as a clone to replace the deleted computing resource 104. The computing resource 110 may have a configuration that equals or approximates a configuration that was had by the computing resource 104 at T1. As a result, at a third time (T3), the service provider environment 100 may be in a reverted state that approximates the initial state.

In some scenarios, several changes may have been made to the customer environment before the customer notices that the previously operational functionality has stopped working. These changes may have been made under several different user accounts that are associated with the customer account. The customer may therefore wish to revert the computing environment back to a state in which the previously operational functionality was working properly. The present technology provides the operations which can be used to reverse multiple changes, reverse changes across multiple user accounts within a customer account, or restore the operating state of computing resources accessed by customer.

In a more specific reversion example, a customer may inadvertently change the customer environment as a result of a typing error or some other mistake that was made while using a control interface to manage the customer environment. The customer may, for example, accidentally create 1000 new computing instances after intending to create 100 new computing instances (e.g., by unwittingly typing an extra "0"). The customer may wish to reverse the change in order to avoid incurring charges from the service provider for the new computing instances that were created by mistake. Further, the service provider may be notified in such cases in order to determine whether service provider charges may be reduced or waived.

Figure 2A:
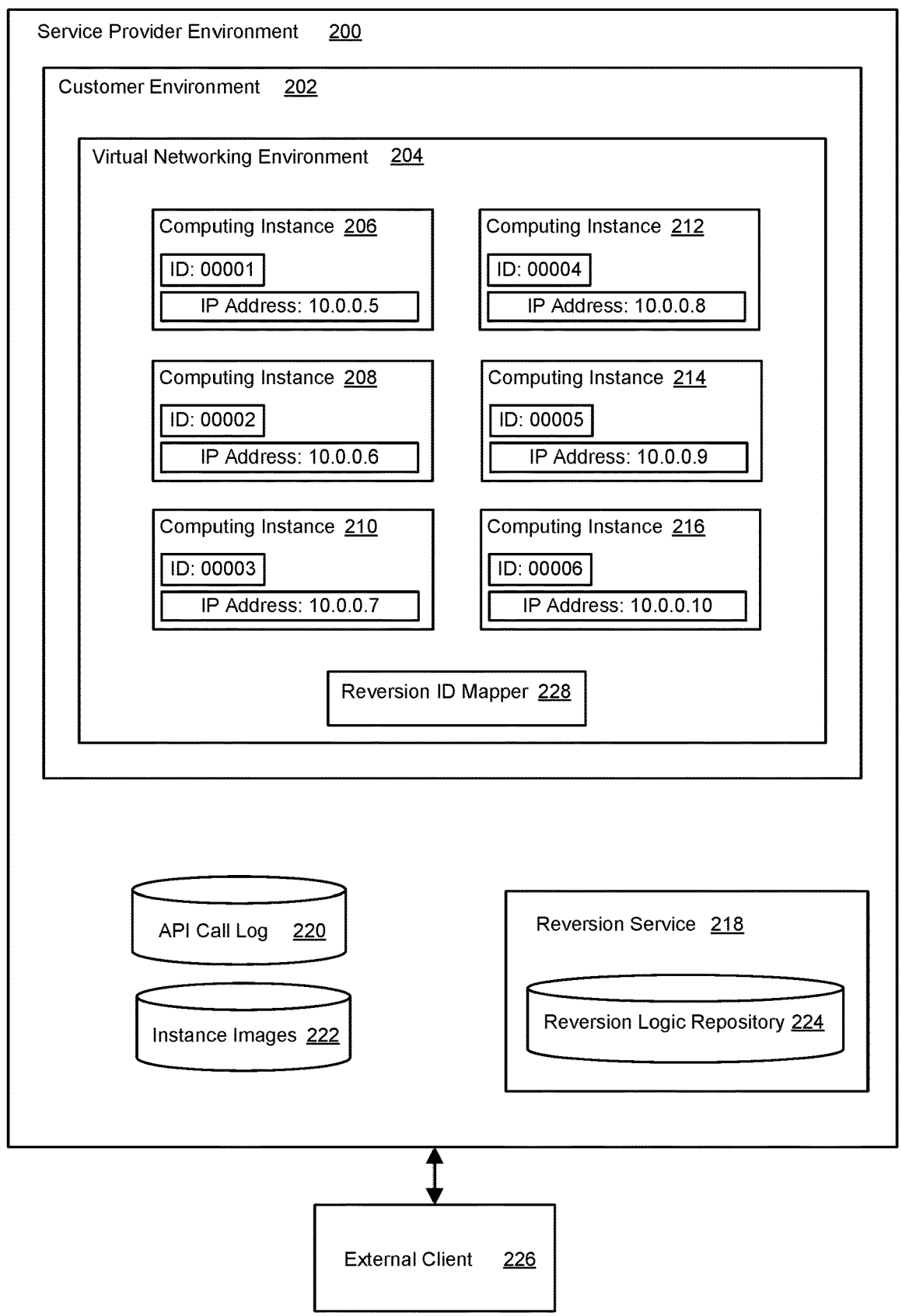
FIGS. 2a-2c illustrate a series of states of a customer environment in accordance with an example.
Figure 2B:
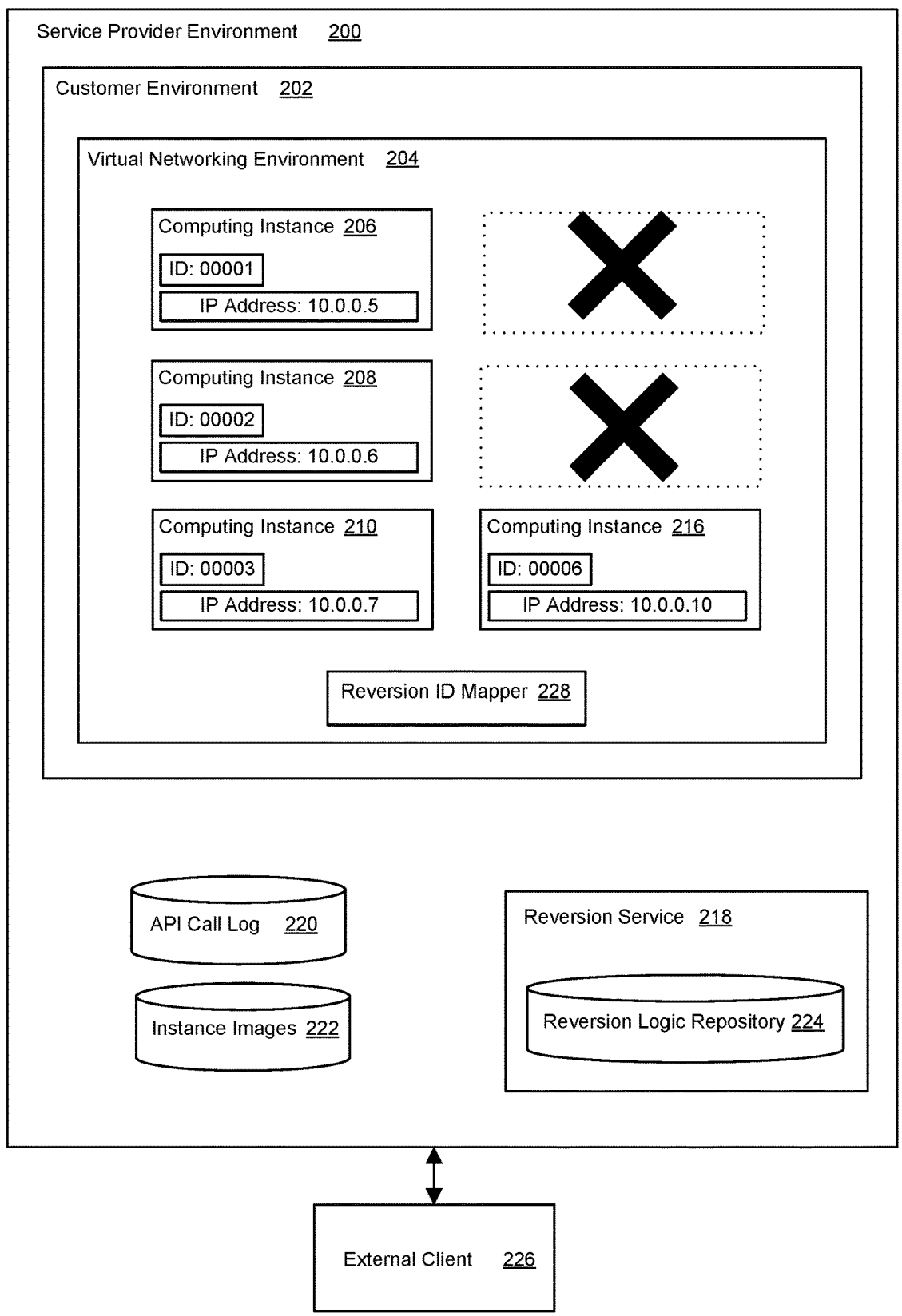
Figure 2C:
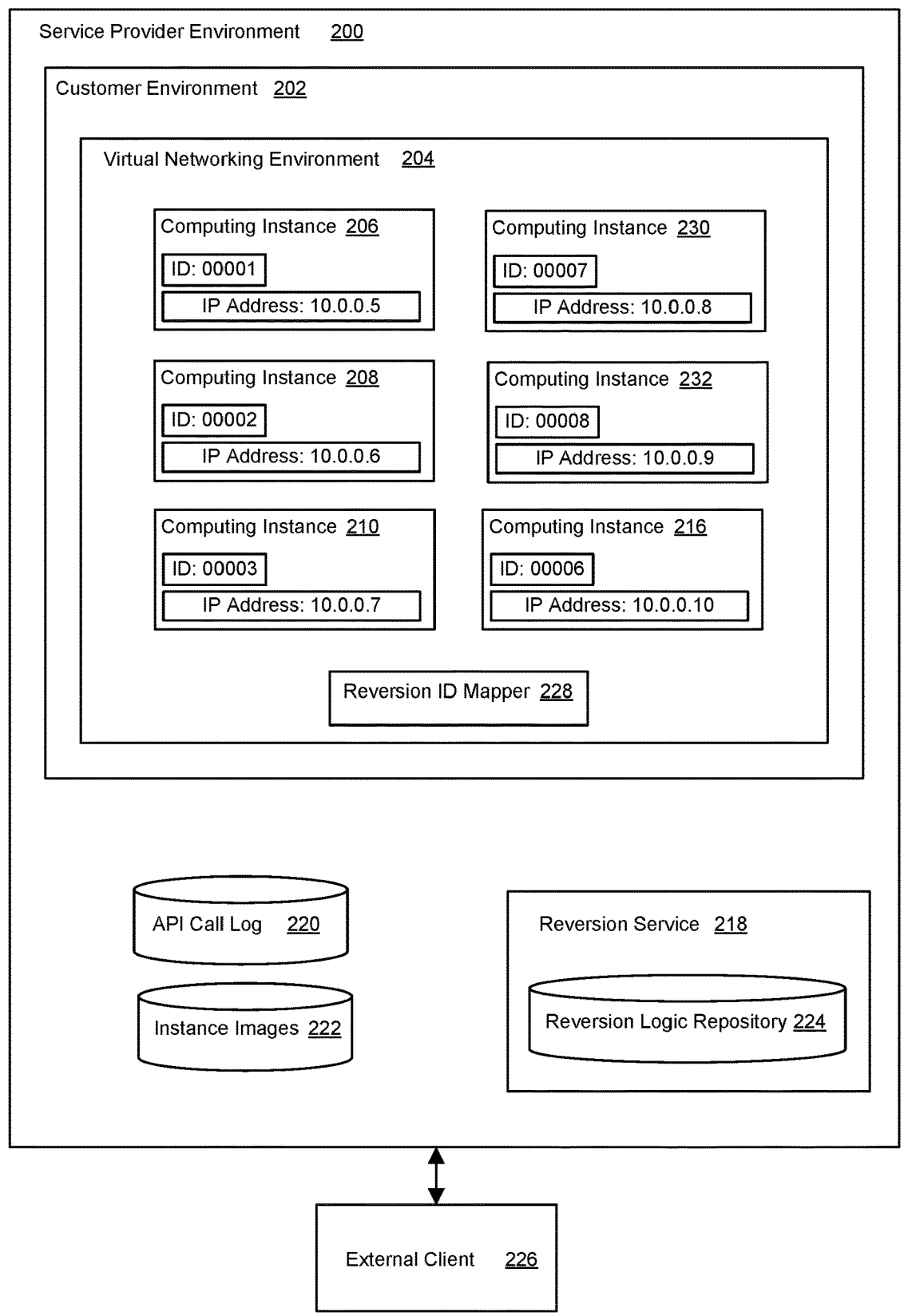

FIGS. 2a-2c illustrate a series of states of a customer environment 202 within a service provider environment 200 in accordance with an example. FIG. 2a illustrates an initial state of the customer environment 202 in the service provider environment 200. Computing instances 206, 208, 210, 212, 214, and 216 may be included in a virtual networking environment 204. Each computing instance 206-216 may have an object identifier (ID) and an internet protocol (IP) address.

The service provider environment 200 may include an application programming interface (API) call log 220 that logs API calls that are made within the customer environment 202. The service provider environment 200 may also include instance images 222. The instance images 222 may include, for example, digital images of the computing instances 206-216 in an execution state and digital images of other computing resources that may exist within the customer environment 202. Alternatively, an image of a computing resource may comprise, for example, a snapshot of the computing resource or an image such as a virtual machine image that is ready to be run on a hypervisor. A snapshot may be, for example, metadata that is usable to provide a reversion of a computing resource or metadata usable to reconstruct a computing resource. In addition, a snapshot may be a machine image or install image that is captured to enable a reversion of a computing resource.

The service provider environment 200 may also include a reversion service 218. The reversion service 218 may be in communication with a reversion ID mapper 228 that maps object IDs of existing computing resources to deleted computing resources within the virtual networking environment 204. The reversion service 218 may include a reversion logic repository 224. The reversion logic repository 224 may include a set of rules that define how certain types of changes made to the customer environment 202 may be reversed, reverted, rescinded, inverted, or undone. For example, the reversion logic repository 224 may include a rule specifying that a deletion of a computing instance may be reversed by creating a new computing instance from a stored image of the deleted computing instance, mapping the object ID of the new computing instance to the object ID of the deleted computing instance, and assigning the IP address of the deleted computing instance to the new computing instance (or mapping a new IP address assigned to the new computing instance to the IP address of the deleted computing instance). The mapping of the object IDs may enable computing resources in the virtual networking environment 204 that use the old object IDs to access the old object IDs without creating unexpected failures or errors. In one example, a command to delete computing instance 212 and computing instance 214 may be received from an external client 226. The command may be executed such that the customer environment 202 may be changed to a modified state.

FIG. 2b illustrates the customer environment 202 in the modified state. While computing instances 212, 214 have been deleted, the instance images 222 may still include stored images of computing instances 212, 214. In some examples, the IP addresses of deleted computing instances may be reassigned to other computing instances after a predetermined amount of time has elapsed.

A reversion command may then be received from the external client 226 requesting that the last command (e.g., the deletion of computing instances 212, 214) be reverted so that the customer environment 202 may be changed to a reversion state that approximates the initial state shown illustrated in FIG. 2a. This may occur, for example, if a customer at the external client 226 discovers that a service or process that functioned properly in the initial state has ceased functioning properly in the modified state or if the command to delete the computing instances 212, 214 was erroneously sent.

FIG. 2c illustrates the customer environment 202 in a reversion state that approximates the initial state illustrated in FIG. 2a. The reversion service 218 may change the customer environment 202 from the modified state illustrated in FIG. 2b to the reversion state in the following manner in accordance with an example.

To provide the reversion state, the reversion service 218 may check or query the API call log 220 to determine that the last successfully executed command was to delete computing instances 212, 214. The reversion service 218 may then check or query the reversion logic repository 224 in order to determine what operations to use in order to revert the deletion of the computing instances 212, 214. As mentioned above, the reversion logic repository 224 may include a rule or rules specifying that a deletion of a computing instance may be reverted by creating a new computing instance from a stored image of the deleted computing instance, mapping the object ID of the new computing instance to the object ID of the deleted computing instance, and assigning the IP address of the deleted computing instance to the new computing instance (or mapping a new IP address assigned to the new computing instance to the IP address of the deleted computing instance).

The reversion service 218 may then retrieve an image of the computing instances 212, 214 from the instance images 222 data store, and a computing instance 230 may be created using the image of the computing instance 212. In addition, a computing instance 232 may be created using the image of the computing instance 214. The reversion ID mapper 228 may map an object ID assigned to the computing instance 230 to the object ID of the deleted computing instance 212. Similarly, the reversion ID mapper 228 may also map an object ID assigned to the computing instance 232 to the object ID of the deleted computing instance 214.

In an another example, the computing instances 230, 232 may be created to replace a deleted computing instances 212, 214 and previously captured configuration information may be applied to the computing instances 230, 232 to match or approximate the states of the computing instance 230, 232 to match the states the deleted computing instances 212, 214 (respectively). As a further example, the computing instances 230, 232 may replace the deleted computing instances 212, 214 without any additional configurations being applied.

The reversion service 218 may also assign the IP address of the deleted computing instance 212 to the computing instance 230 and assign the IP address of the deleted computing instance 214 to the computing instance 232, if the IP addresses are still available. In examples where the IP addresses of deleted computing instances may be reassigned after a predetermined amount of time has elapsed, the reversion service 218 may verify that the predetermined amount of time has not yet elapsed since computing instances 212, 214 were deleted. If the predetermined amount of time has elapsed, however, the reversion service 218 may determine whether the IP addresses assigned to the deleted computing instances 212, 214 have actually been reassigned. If the IP addresses of the computing instances 212, 214 have not yet been reassigned even though the predetermined amount of time has passed, the reversion service 218 may still assign the IP addresses of the deleted computing instances 212, 214 to the computing instances 230, 232, respectively. Otherwise new IP addresses may assigned to the computing instances 230, 232.

As illustrated in FIG. 2c, once the customer environment 202 has been changed to the reversion state by the reversion service 218, the customer environment 202 may operate or function in a manner such that the reversion state approximates or estimates the initial state illustrated in FIG. 2a. In particular, the two computing instances 230, 232 may serve as exact copies or near reproductions of the computing instances to take the places of the deleted computing instances 212, 214, respectively.

The example illustrated in FIGS. 2a-2c shows a single IP address assigned to each computing instance. However, in other examples, a computing instance in a customer environment may be assigned two IP addresses: a private IP address that is associated with the customer account rather than the computing instance, and a public IP address that is associated with the computing instance rather than the customer account. The public IP address may be mapped to the private IP address through network address translation (NAT). When the computing instance is deleted, the private IP address may remain assigned to the customer account and therefore may not be reassigned unless the customer chooses to reassign it or the customer account is deleted. The public IP address, by contrast, may be reassigned shortly after the computing instance is deleted without requiring any additional action other than the deletion.

In this scenario, when a reversion operation is requested, the reversion service may use an image of the deleted computing instance to create a new computing instance. The reversion service may then assign the private IP address to the new computing instance if the private IP address is still available. The reversion service may also assign the public IP address to the new computing instance if the public IP address is still available.

Figure 3A:
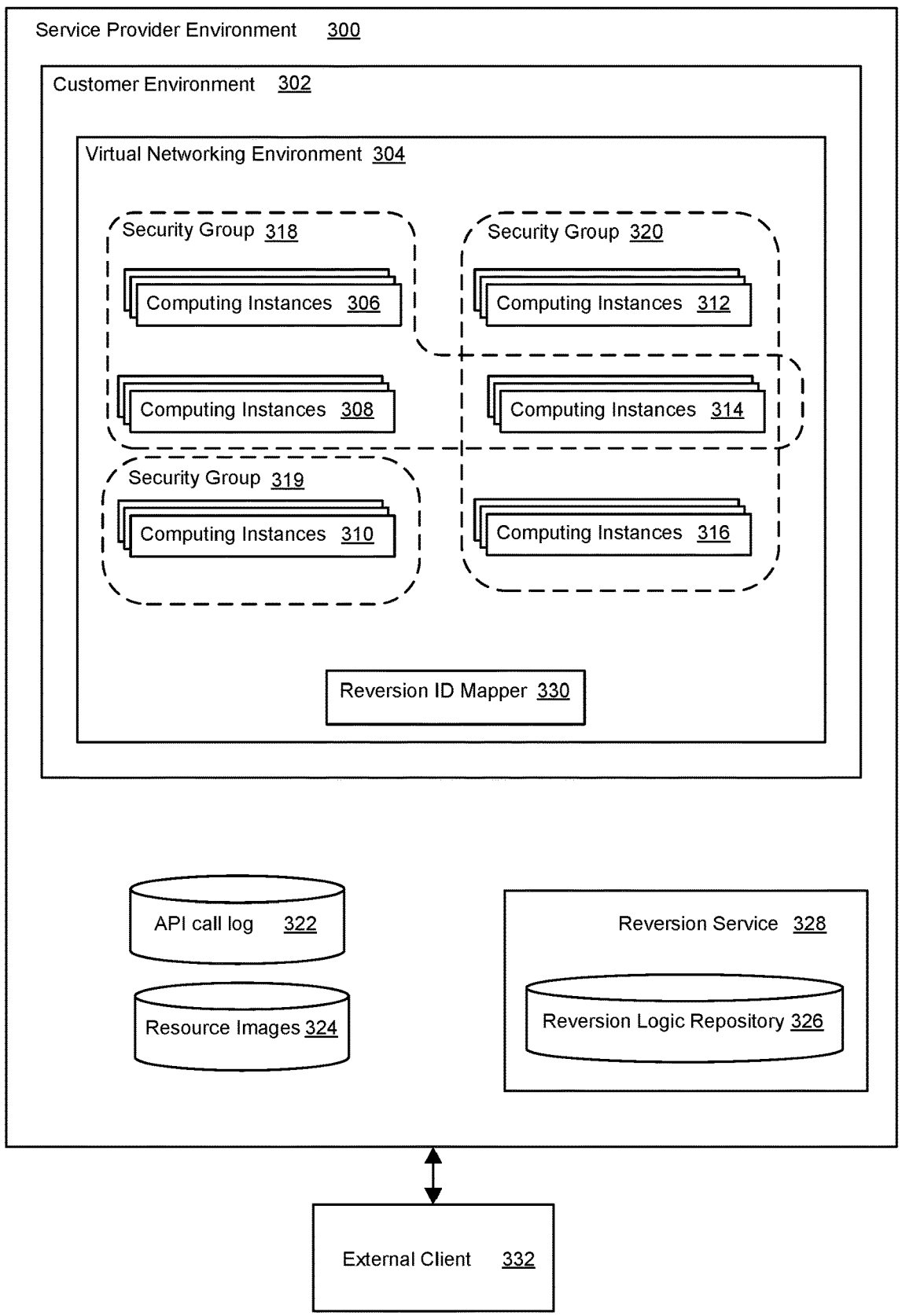
FIGS. 3a-3c illustrate another series of states of a customer environment in accordance with an example.
Figure 3B:
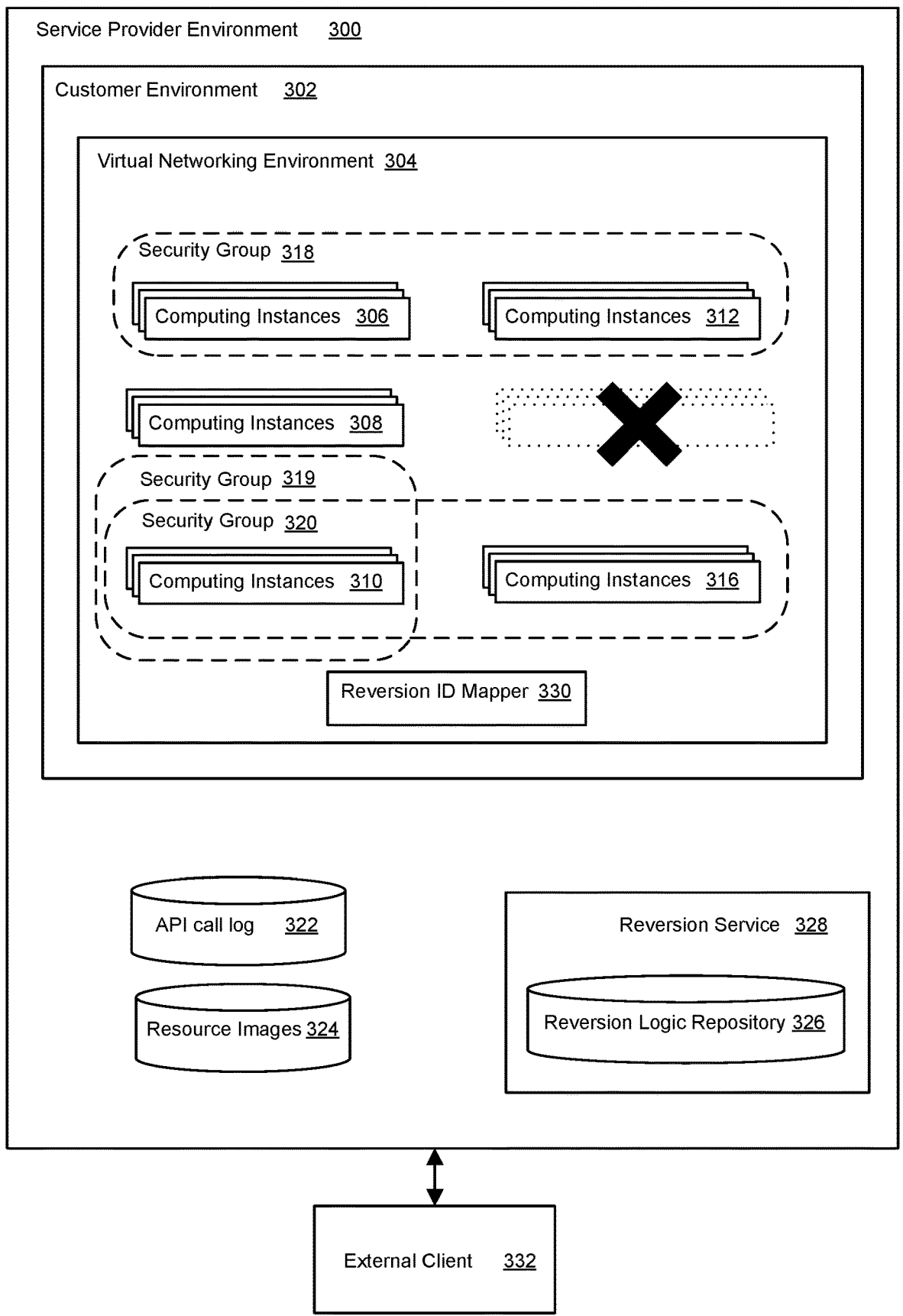
Figure 3C:
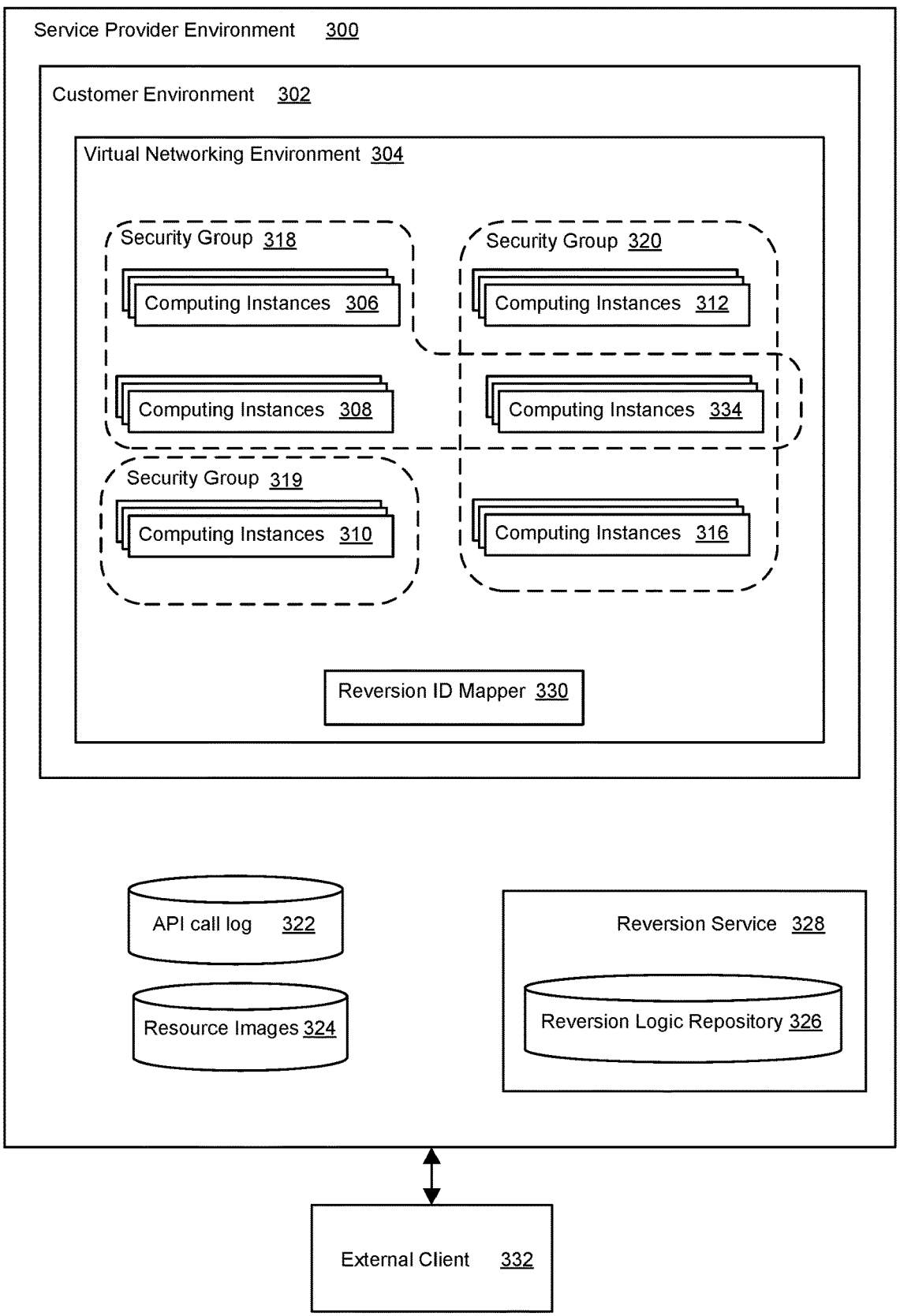

FIGS. 3a-3c illustrate another series of states of a customer environment 302 within a service provider environment 300 in accordance with an example. FIG. 3a illustrates an initial state of the customer environment 302 and the service provider environment 300. Computing instances 306, 308, 310, 312, 314, 316 may be included in a virtual networking environment 304. In some examples, an individual computing instance (e.g., selected from any of the computing instances 306, 308, 310, 312, 314, or 316) may have an object identifier (ID) and an internet protocol (IP) address.

Within the virtual networking environment 304, there may be a security group 318 that includes computing instances 306, 308, 314. There may also be a security group 320 that includes computing instances 312, 314, 316 and a security group 319 that includes computing instances 310. A security group may comprise a set of computing resources that conform to a predefined set of rules governing inbound or outbound network traffic. A single computing resource (e.g., computing instance) may belong to more than one security group. In some examples, one computing resource may be contained within another computing resource (e.g., a data store computing resource within a computing instance).

The service provider environment 300 may also include an application programming interface (API) call log 322 that logs API calls that are made to or are made within the customer environment 302. The service provider environment 300 may also include resource images 324. The resource images 324 may include, for example, digital images of the computing instances 306-316 and digital images of other computing resources that may exist within the customer environment 302. An image of a computing resource may comprise, for example, a snapshot of the computing resource or a virtual appliance such as a virtual machine image that is ready to be run on a hypervisor. A snapshot may also be, for example, metadata or a machine image, as discussed earlier.

The service provider environment 300 may also include a reversion logic repository 326. The reversion logic repository 326 may include a set of rules that define how certain types of changes made to the customer environment 302 may be reversed, reverted, rescinded, inverted, undone, nullified, neutralized, counterbalanced, corrected, negated, or offset. For example, the reversion logic repository 326 may include a rule specifying that a deletion of a computing instance may be reverted by creating a new computing instance from a stored image of the deleted computing instance, mapping the object ID of the new computing instance to the object ID of the deleted computing instance, and assigning the IP address of the deleted computing instance to the new computing instance (or mapping a new IP address assigned to the new computing instance to the IP address of the deleted computing instance).

In addition, the reversion logic repository 326 may include one or more rules pertaining to changes that are specifically made to security groups. For example, the reversion logic repository 326 may include a rule specifying that the removal of a computing resource from a security group may be reverted by the addition the computing resource back to the security group. The reversion logic repository 326 may also include a rule specifying the addition of a computing resource to a security group may be reverted by the removal of the computing resource from the security group.

In some examples, a command to add a computing resource to a security group may be accomplished through an API call and the command to remove a computing resource from a security group may also be accomplished by an API call. In such examples, the API call to remove a computing resource from a security group and the API call to add a computing resource to a security group may be considered to be of "mirror" or inverse API call types of each other. In some examples, a first series of API calls might be used to accomplish a state change of a customer environment. In some examples, if each API call type in the first series has a corresponding inverse API call type, the first series of API calls may be undone by a second series of API calls. The first API call of the second series may be of an inverse API call type of the last API call of the first series, the second API call of the second series may be an inverse API call type as the penultimate API call of the first series, and so on. In other words. The second series may be the inverse API calls of the first series in reverse order. Alternatively, other operation ordering may be used.

The service provider environment 300 may also include a reversion service 328 and a reversion ID mapper 330 that maps object IDs of existing computing resources to deleted computing resources, as discussed earlier.

In one example, a command to delete the computing instances 314 may be received, and commands to remove computing instances 308 and 312 from security groups 318 and 320, respectively, may be received. In addition, commands to add computing instances 312 and 310 to security groups 318 and 320, respectively, may be received. The commands may be executed such that the customer environment 302 may be changed to a modified state. The commands may be issued under a single customer account or under different customer sub-accounts (e.g., user accounts) that have permission to make changes to the customer environment 302. The commands may be received from an external client 332.

While FIG. 3a illustrates one example of a customer environment that includes one virtual networking environment and three security groups, other examples consistent with the technology of the present disclosure may have different numbers of virtual networking environments and different numbers of security groups. In addition, different combinations and numbers of computing resources may exist in other examples consistent with the technology of the present disclosure.

FIG. 3b illustrates the customer environment 302 in the modified state. While the computing instances 314 have been deleted, the resource images 324 may still include stored images of the computing instances 314. In addition, the resource images 324 may include images of the security groups 318, 319, 320 from the initial state shown in FIG. 3a.

A reversion command may then be received from the external client 332 requesting that the customer environment 302 be changed to a reversion state that approximates the initial state shown illustrated in FIG. 3a. This may occur, for example, if a user/customer at the external client 332 discovers that a service or process that functioned properly in the initial state has ceased functioning properly in the modified state or if the commands to delete computing instances 314 and change the memberships of security group 318 and security group 320 were erroneously sent.

FIG. 3c illustrates the customer environment 302 in a reversion state that approximates the initial state illustrated in FIG. 3a. The reversion service 328 may change the customer environment 302 from the modified state illustrated in FIG. 3b to the reversion state in the following manner in accordance with an example.

The reversion service 328 may check or query the API call log 322 in order to determine what commands have been successfully executed in the customer environment 302 in a time interval between a time when the customer environment 302 was in the initial state illustrated in FIG. 3a and a time when the customer environment attained the modified state illustrated in FIG. 3b. The reversion service 328 may then check or query the reversion logic repository 326 in order to determine what operations to use in order to revert the customer environment 302 from the modified state into a reversion state that approximates the initial state.

As mentioned above, the reversion logic repository 326 may include a rule specifying that a deletion of a computing instance may be reverted by creating a new computing instance from a stored image of the deleted computing instance, mapping the object ID of the new computing instance to the object ID of the deleted computing instance, and assigning the IP address of the deleted computing instance to the new computing instance (or mapping a new IP address assigned to the new computing instance to the IP address of the deleted computing instance). As mentioned above, the reversion logic repository 326 may have a rule specifying that the removal of a computing resource from a security group may be reverted by the addition the computing resource back to the security group and a rule specifying that the addition of a computing resource to a security group may be reverted by the removal of the computing resource from the security group.

The reversion service 328 may then retrieve images of the computing instances 314 from the resource images 324. Computing instances 334 may be created using the images of the computing instances 314. Specifically, in some examples, for each computing instance x in the computing instances 314, a corresponding computing instance y may be created in the computing instances 334 using an image of computing instance x.

The reversion ID mapper 330 may map object IDs assigned to the newly instantiated computing instances 334 to the object IDs of the corresponding deleted computing instances 314. The reversion service 328 may also assign IP addresses of the deleted computing instances 314 to the corresponding computing instances 334. In examples where the IP addresses of deleted computing instances may be reassigned after a predetermined amount of time has elapsed, the reversion service 328 may verify that the predetermined amount of time has not yet elapsed since the computing instances 314 were deleted. If the predetermined amount of time has elapsed, however, the reversion service 328 may determine whether the IP addresses assigned to the deleted computing instances 314 have actually been reassigned. If some or all of the IP addresses of the computing instances 314 have not yet been reassigned even though the predetermined amount of time has passed, the reversion service 328 may still assign the IP addresses of the deleted computing instances 314 that have not yet been reassigned to the corresponding computing instances 334.

The reversion service 328 may add the computing instances 334, 308 to the security group 318. In addition, the reversion service 228 may add the computing instances 334, 312 to the security group 320. The reversion service may also remove computing instances 310 from security group 320 and remove computing instances 312 from security group 318.

Once the customer environment 302 has been changed to the reversion state illustrated in FIG. 3c by the reversion service 328, the customer environment 302 may operate or function in a manner such that the reversion state approximates the initial state illustrated in FIG. 3a. In particular, the computing instances 334 may serve as clones of the corresponding deleted computing instances 314.

Figure 4:
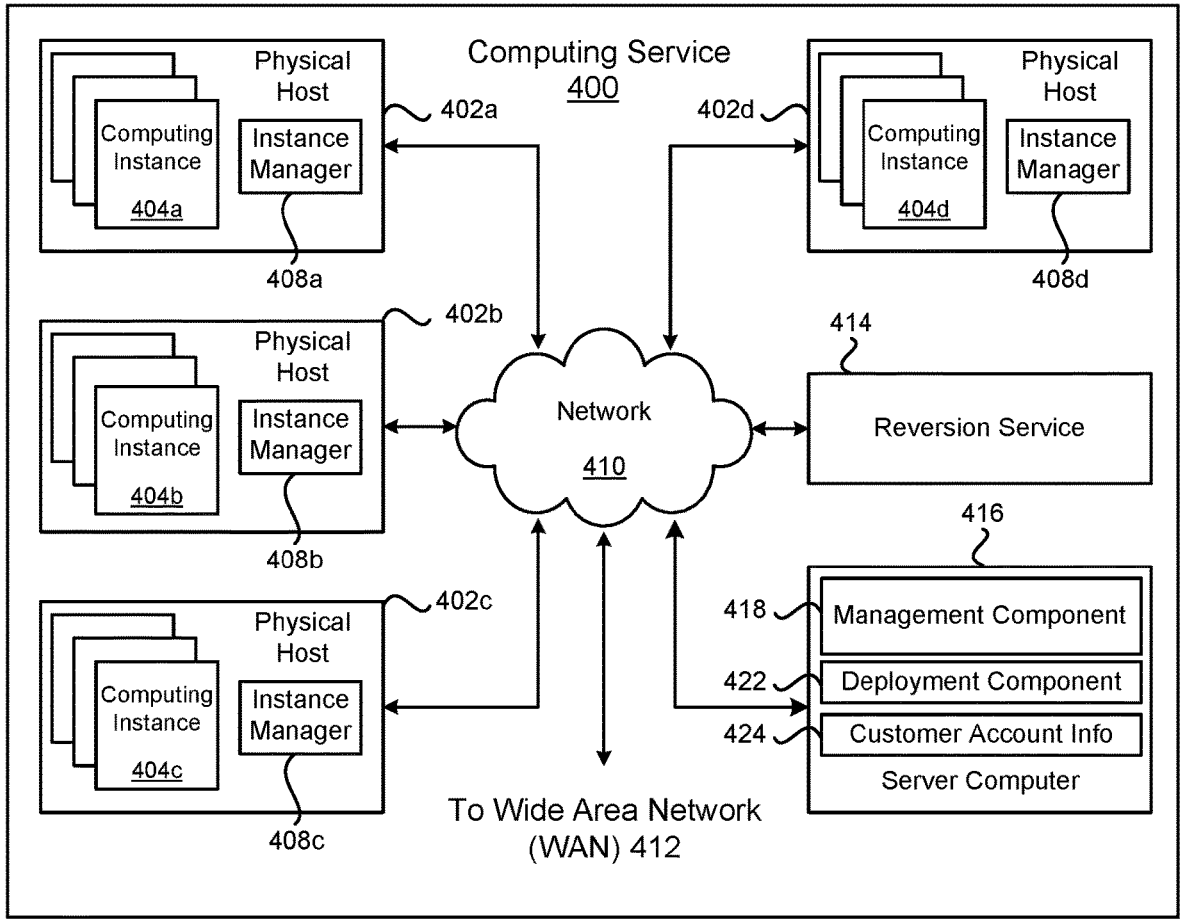
FIG. 4 is a block diagram illustrating a computing service that may be used to execute software services in association with a reversion service in accordance with an example.

FIG. 4 is a block diagram illustrating an example computing service 400 that may be used to execute software services in association with a reversion service. In particular, the computing service 400 depicted illustrates one environment in which the technology described herein may be used. The computing service 400 may be one type of environment (e.g., a service provider environment) that includes various virtualized service resources that may be used, for instance, to host computing instances 404a-d on which a reversion service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing the reversion service. For example, a server computer 414 may execute a reversion service that enables customers to partition a search performed on log events in multiple log streams that are generated by multiple hosts (e.g., computing instances).

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer.

For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and provide other types of information. The deployment component 422 may utilize the customer-provided configuration and cache logic to configure, initialize, and launch computing instances 404a-d. The configuration, cache logic, and other information may be specified by a customer accessing the management component 418 or by may be provided directly to the deployment component 422.

Customer account information 424 may include any desired information associated with a customer of the multi-tenant environment. For example, the customer account information may include an identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

FIG. 5 illustrates an example of a table 500 of information that may be provided to advise a customer of recent changes that have been made to a customer environment and of reversion constraints, caveats, or provisos that may apply to a reversion service in a service provider environment in which the customer environment is situated. Table 500 may include a change column 502, a user column 504, a time column 506, a reversion options column 508, and a reversion constraints column 510. A row in the table 500 may be considered a table entry that represents: a change (or a related group of changes) that has successfully occurred in the customer environment, a user who sent a command instructing that the change (or group of changes) be made, a time at which the change (or group of changes) was made, a reversion option that may be applied by a reversion service to reverse (or partially reverse or compensate for) the change, and reversion constraints that limit the reversion option.

For example, the first row 512 indicates that a subnet XYZ was created by a user JUST4U2C at 7:46 pm on Jun. 29, 2015. This row 512 also indicates that a reversion option exists in that subnet XYZ can be deleted. As an advisory, the second row 514 indicates that the user JUST4U2C then created a computing instance (with an object ID of 00001) at 10:27 pm and indicates that an applicable reversion option for the creation of the computing instance would be the deletion of the computing instance.

A third row 516 may indicate that a user I8AΠ deleted a data store (with an object ID of 0003) at 6:12 am on July 1. The third row 516 also indicates that a reversion option to create a clone of the deleted data store 0003 (e.g., having the same configuration and same unencrypted data that existed in the deleted data store 0003) is available, but that encrypted volumes from the deleted data store 0003 may not be restored and that the clone will not have the same object ID number as the deleted data store 0003. However, the clone's object ID may be mapped to the object ID of the data store 0003 (e.g., so that the clone's object ID and 0003 are considered to be aliases of each other).

A fourth row 518 indicates that a user CUL8R created a security group ABC at 6:13 am and that, as a reversion option, the security group ABC can be deleted. The fourth row 518 also provides an advisory that deleting a security group may cause computing resources that formerly belonged to the security group to lose firewall benefits.

A fifth row 520 indicates that that the user CUL8R then added the computing instance 00001 (created by the user JUST4U2C as shown in row 514) to the security group ABC. The fifth row 520 indicates that removal of the computing instance 00001 from the security group ABC is available as a reversion option, but advises that this may cause the computing instance 00001 to lose firewall benefits provided by the security group ABC.

A sixth row 522 indicates that a user XLR8 deleted the computing instance 00003 at 6:20 am on July $1^{st}$. The sixth row 522 indicates that a clone of computing instance 00003 can be created as a reversion option, but that the clone would not have the same object ID. The clone's object ID, however, can be mapped to the object ID 00003.

A customer's agent (e.g., a user) may inspect the table 500 and, in conjunction with the customer's needs or desires, decide to perform selected, available reversion options in order to transform the customer environment into a transformed state. The transformed state may approximate an initial state of the customer environment that existed before the changes mentioned in table 500 were performed. In some examples, the customer's agent may choose to exercise reversion options for changes that occurred after a certain point in time. In some examples, the customer agent may also choose to exercise reversion options for changes made by a certain user or users. In some examples, where multiple changes are to be reverted, the reversion options may be performed in a last-in-first-out (LIFO) fashion such that changes are reverted in reverse chronological order.

A potentially complex situation that may arise if changes for a first user are to be reverted and subsequent changes made by other users are not to be reverted. For instance, consider a scenario in which a customer agent requests that changes made by the user JUST4U2C in the table 500 be reverted, but that no changes made by other users be reverted. If the JUST4U2C's creation of the computing instance 00001 in the second row 514 is reverted, CUL8R's addition of the computing instance 00001 to the security group ABC will also be effectively reverted because the computing instance 00001 will cease to exist. In cases such as this where dependencies exist between changes made by different users and reverting the changes made by one user will affect changes made by others, an advisory can be sent to warn the customer that reverting changes made by one user may also affect subsequent changes made by other users.

Figure 6:
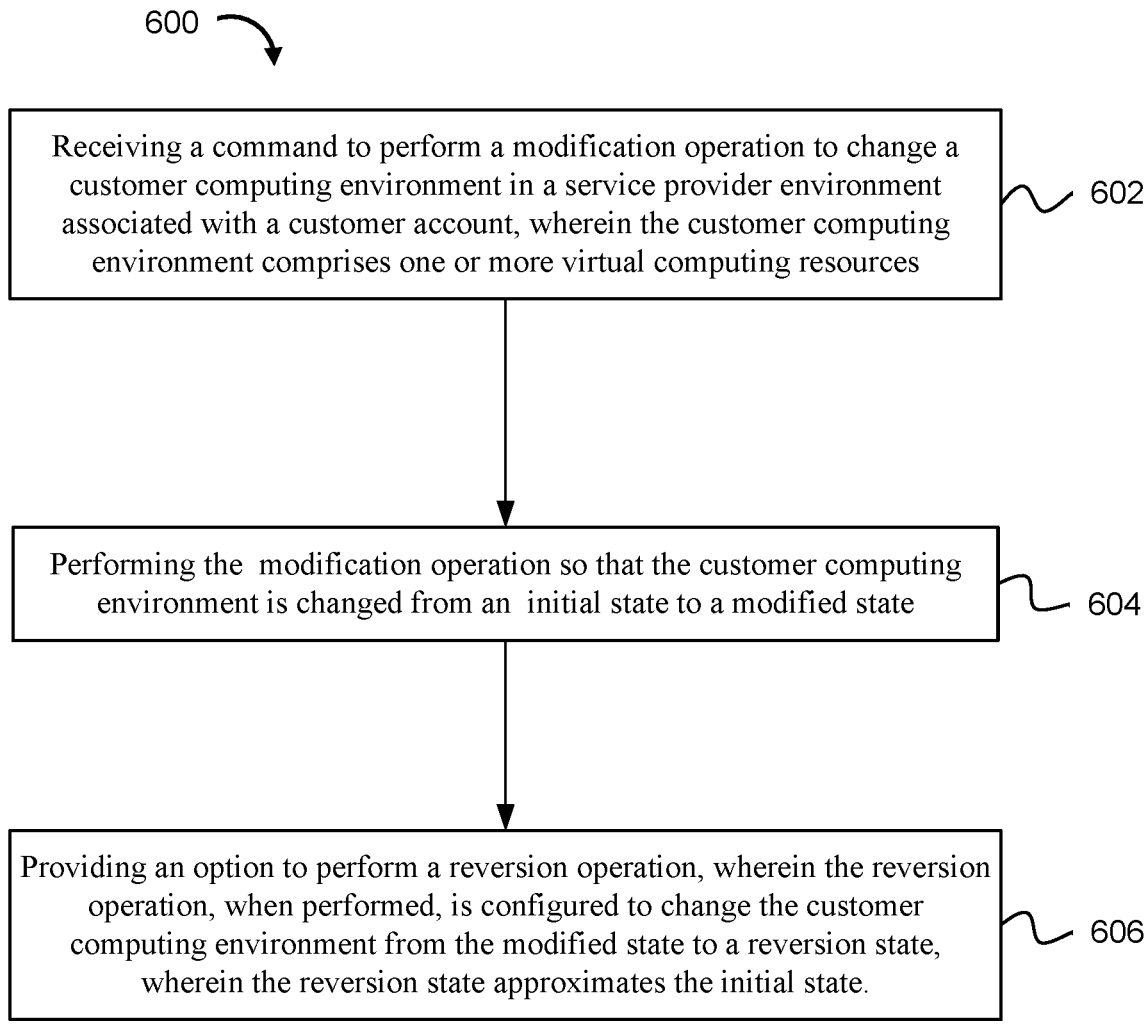
FIG. 6 illustrates operations of a reversion service of a service provider environment in accordance with an example.

FIG. 6 illustrates operations 600 of a reversion service of a service provider environment (e.g., a virtual computing environment) in accordance with an example. The functionality can be implemented as instructions stored and executed on a machine, where the instructions are included on at least one non-transitory computer-readable storage medium.

As in block 602, a command to perform a modification operation (e.g., a transformation operation) to change a customer environment in a service provider environment associated with a customer account may be received. The customer environment may comprise one or more virtual computing resources. The one or more virtual computing resources may comprise one or more virtual computing instances, one or more data store instances, one or more virtual networking devices, one or more security configurations, or one or more application configurations.

In some examples, a copy or snapshot of the customer environment (e.g., comprising metadata and/or images of one or more virtual computing resources in the customer environment) in the initial state before the modification operation is performed can be created. Additionally, in some examples, one or more digital images of one or more corresponding computing resources operating in the service provider environment can be stored.

In some examples, the modification operation may comprise deleting an initial computing instance or data store instance that is associated with an identifier. An initial computing instance may also be associated with an internet protocol (IP) address.

In some examples, the modification operation may comprise changing an association of a virtual computing resource with a security group, a subnet, or a virtual private network connection in the initial state of the customer environment.

As in block 604, the modification operation may be performed so that the customer environment is changed from an initial state to a modified state.

In examples where an initial computing instance that was associated with an IP address is deleted by the modification operation, reassignment of the IP address can be delayed or postponed for a predefined period of time.

As in block 606, a command option (or reversion option) to perform a reversion operation may be provided. The reversion operation, when performed, may be configured to change the customer environment from the modified state to a reversion state that approximates the original state. The command option to perform the reversion operation may include a time option to revert changes that occurred after a specific time or changes that were made by a specific user.

In examples where an initial computing instance or data store instance is deleted by the modification operation, a clone computing instance or a clone data store instance that replicates a configuration of the initial computing instance or data store instance, respectively, can be created. In addition, a mapping that maps an identifier associated with the clone instance to the identifier associated with the initial instance can be generated. In examples where an initial computing instance was associated with an IP address, the IP address can be assigned to the cloned computing instance if the reversion operation is performed within the pre-defined period of time (or the IP address has not yet been reassigned when the reversion operation is performed).

In examples where the modification operation comprises changing an association of a virtual computing resource with a security group, a subnet, or a virtual private network connection, the reversion operation may comprise reversing the change of the association.

In some examples, a log of application programming interface (API) calls that are made by the modification operation may be created. The reversion operation may be configured to use the log of API calls to determine one or more reversion-operation API calls to use in order to change the customer environment to the reversion state.

In examples where a copy of the customer environment is made, the reversion operation may be configured to change the service provider environment to the reversion state based on the copy. In examples where digital images of virtual computing resources are stored, the reversion operation may be configured to change the service provider environment to the reversion state based on the digital images.

In some examples, reversion-limitation information that identifies aspects of the modification operation that cannot be undone by the reversion operation may be provided.

Figure 7:
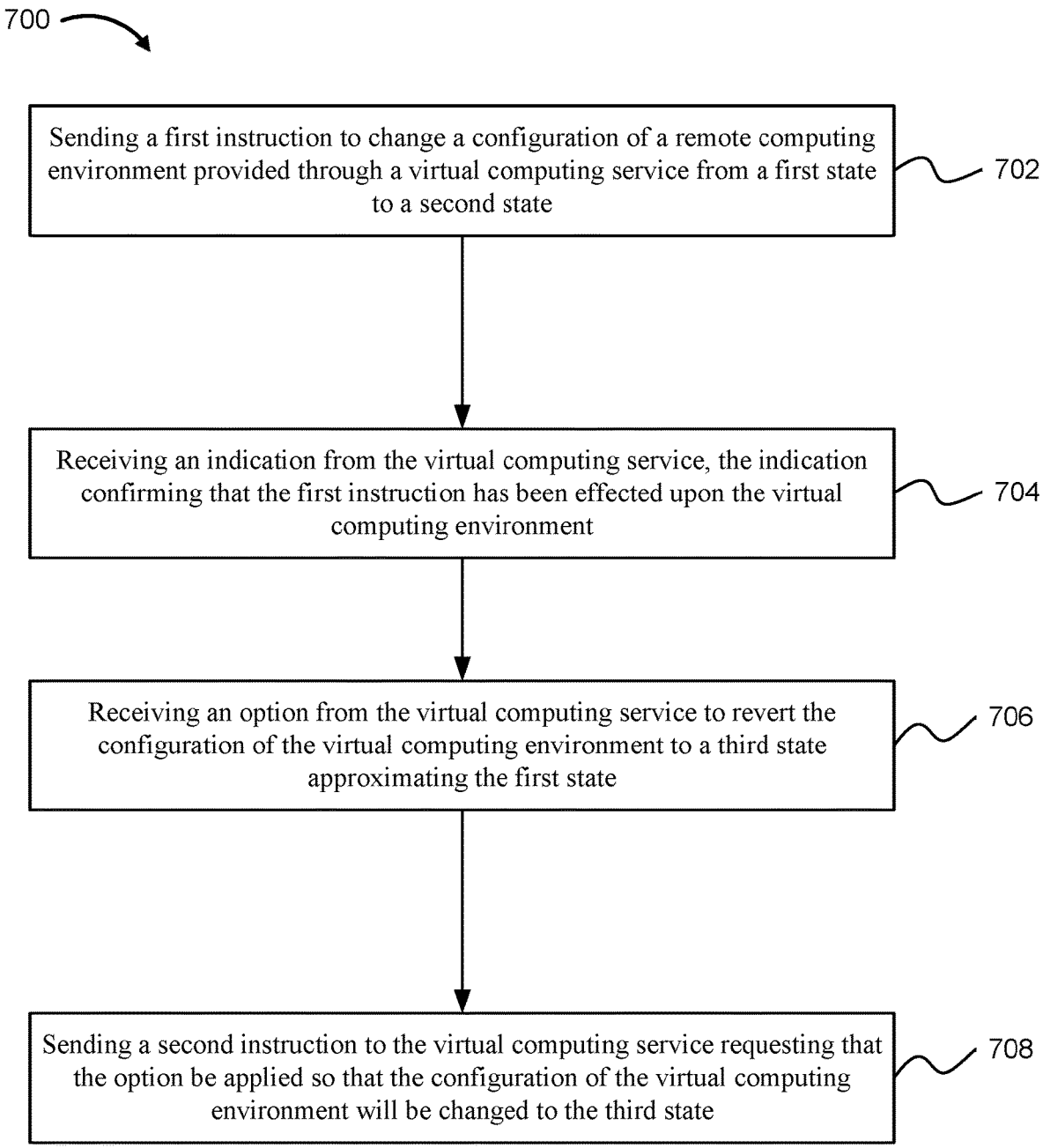
FIG. 7 illustrates operations consistent with a reversion service in accordance with another example.

FIG. 7 illustrates operations 700 consistent with a reversion service in accordance with another example. The functionality can be implemented as instructions stored and executed on a machine, where the instructions are included on at least one non-transitory computer-readable storage medium.

As in block 702, a first instruction to change a configuration of a remote computing environment provided through a virtual computing service from a first state to a second state can be sent (e.g., from a client device).

As in block 704, an indication from the virtual computing service can be received. The indication may confirm that that the first instruction has been effected upon the virtual computing environment.

As in block 706, a command option can be received from the virtual computing service. The command option may be to revert the configuration of the virtual computing environment to a third state approximating the first state.

As in block 708, a second instruction can be sent to the cloud computing service requesting that the command option be applied so that the configuration of the virtual computing environment will be changed to the third state.

Figure 8:
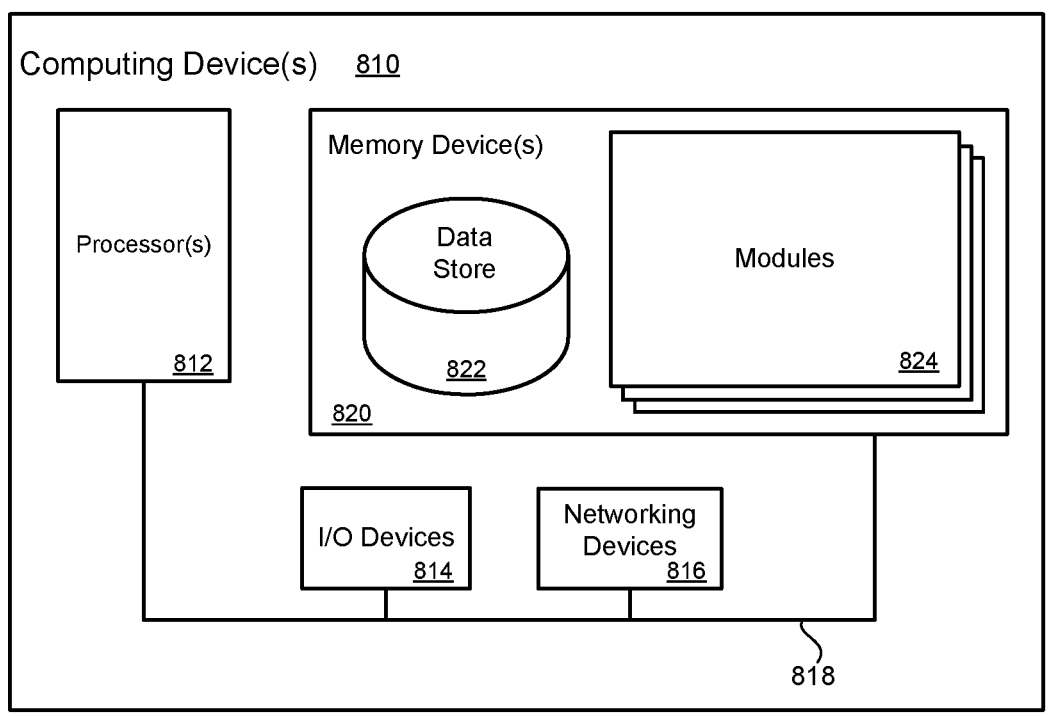
FIG. 8 illustrates a computing device on which modules of the present disclosure technology may be executed.

FIG. 8 illustrates a computing device 810 on which modules of this technology may execute. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules that are executable by the processor(s) 812 and data for the modules. Located in the memory device 820 are services and modules executable by the processor. The modules may execute the functions described earlier. A data store 822 may also be located in the memory device 820 for storing data related to the modules and other applications along with an operating system that is executable by the processor(s) 812.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Other applications may also be stored in the memory device 820 and may be executable by the processor(s) 812. Components or modules discussed in this description may be implemented in the form of software using high programming level languages that are compiled, interpreted, or executed using a hybrid of the methods.

The computing device may also have access to I/O (input/output) devices 814 that are usable by the computing devices. An example of an I/O device is a display screen 840 that is available to display output from the computing devices. Other known I/O devices may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, solid state memory, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of example conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the technology be limited, except as by the claims set forth below.

The technology described here may also be stored on a computer readable storage medium that includes volatile and non-volatile, removable and non-removable media implemented with any technology for the storage of information such as computer readable instructions, data structures, program modules, or other data. Computer readable storage media include, but are not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatuses and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

What is claimed is:

1. A method for restoring a virtual computing environment to a previous state, the method comprising:
   receiving a command to perform a transformation operation on a computing resource in a virtual computing environment associated with a customer account, wherein the virtual computing environment comprises the virtual computing resource;

storing a digital image of the computing resource operating in the virtual computing environment;
performing the transformation operation on the computing resource such that the virtual computing environment is changed from an initial state to a transformed state;
providing a command option to perform a reversion operation, wherein the reversion operation is configured to change the virtual computing environment to a reversion state;
receiving an instruction to perform the reversion operation;
applying the reversion operation to change the virtual computing environment to the reversion state, wherein the reversion state approximates the initial state to an extent that is possible as limited by reversion constraints that define which reversion operations are applicable to the virtual computing resource in the virtual computing environment; and
wherein the reversion operation is configured to change the virtual computing environment to the reversion state based on the digital image of the computing resource wherein the computing resource is a computing instance comprising an identifier and the transformation operation comprises deleting the computing instance as defined by the digital image of the computing resource using the identifier and wherein the reversion state includes a second identifier that is mapped to the identifier of the computing instance that has been deleted.

2. The method of claim 1, further comprising:
creating a log of application programming interface (API) calls that are made by the transformation operation; and
using the log of API calls to determine one or more reversion-operation API calls to use in order to change the state of the virtual computing environment to the reversion state.

3. The method of claim 1, further comprising recording a snapshot of the initial state of the virtual computing environment before the transformation operation is performed, wherein the reversion operation is configured to change the virtual computing environment to the reversion state based on the snapshot.

4. The method of claim 1, further comprising storing a digital image of a computing instance that comprises the virtual computing resource, wherein the reversion operation as applied changes the virtual computing environment to the reversion state based on the digital image of the virtual computing instance.

5. The method of claim 1, further comprising storing a digital image of a data store instance, wherein the reversion operation is configured to change the virtual computing environment to the reversion state based on the digital image of the data store instance.

6. A method, comprising:
receiving a command to perform a modification operation to change a customer environment in a service provider environment associated with a customer account, wherein the customer environment comprises one or more virtual computing resources;
storing metadata associated with a virtual computing resource operating in the customer environment;
performing the modification operation so that the customer environment is changed from an initial state to a modified state; and
providing a command option to perform a reversion operation, wherein the reversion operation, when performed, is configured to change the customer environment from the modified state to a reversion state, wherein the reversion state approximates the initial state, and the reversion operation is configured to change the customer environment to the reversion state based on the metadata of the virtual computing resource and wherein the reversion state includes an identifier that is mapped to a second identifier of a deleted virtual computing resource.

7. The method of claim 6, wherein the command option to perform the reversion operation includes an option to revert changes that occurred after a specified time.

8. The method of claim 6, further comprising:
creating a log of application programming interface (API) calls that are made by the modification operation, wherein the reversion operation is configured to use the log of API calls to determine one or more reversion-operation API calls to use in order to change the customer environment to the reversion state.

9. The method of claim 6, further comprising creating a copy of the customer environment in the initial state before the modification operation is performed, wherein the reversion operation, when performed, will change the customer environment to the reversion state based on the copy.

10. The method of claim 6, wherein the command to perform the modification operation to change the customer environment comprises a change to at least one of: an organization of the customer environment, a change to a number of the one or more virtual computing resources used, a change to a type of the one or more virtual computing resources used, or a change to a configuration of the one or more virtual computing resources used.

11. The method of claim 6, wherein the virtual computing resource comprises one or more of: a computing instance, a data store instance, a virtual networking device, a security configuration, or an application configuration.

12. The method of claim 6, wherein the reversion operation replaces a computing instance with a new computing instance and previously captured information is applied to the new computing instance to match a state of the computing instance.

13. The method of claim 6, wherein the reversion operation comprises:
generating a cloned computing instance using the metadata, wherein the cloned computing instance replicates a configuration of a computing instance; and
generating a mapping that maps an identifier associated with the cloned computing instance to the identifier associated with the computing instance.

14. The method of claim 13, further comprising:
associating a computing instance with an internet protocol (IP) address;
delaying reassignment of the IP address for a predefined period of time when the computing instance is deleted; and
assigning the IP address to the cloned computing instance when the reversion operation is performed within the predefined period of time.

15. The method of claim 13, further comprising: changing an association of a computing resource with a security group, a subnet, or a virtual private network connection in a modification operation; and reversing the change of the association via the reversion operation.

16. The method of claim 6, further comprising providing reversion-limitation information that identifies aspects of the modification operation that cannot be undone by the reversion operation.

17. A system, comprising:
at least one processor; and
one or more memory devices including instructions to be executed by the at least one processor in order to:
  receive a command to perform a modification operation on a virtual computing resource in a virtual computing environment associated with a customer account, wherein the virtual computing environment comprises one or more virtual computing resources;
  store a digital image of the virtual computing resource;
  perform the modification operation on the virtual computing resource such that the virtual computing environment is changed from an initial state to a modified state;
  receive an instruction to perform a reversion operation, wherein the reversion operation, when performed, changes the virtual computing environment to a reversion state; and
  apply the reversion operation to change the virtual computing environment to the reversion state, wherein the reversion state approximates the initial state to an extent that is possible based on reversion constraints applicable to the virtual computing resource in the virtual computing environment, wherein the reversion operation is configured to change the virtual computing environment to the reversion state based on the digital image of the virtual computing resource and wherein the reversion state includes a second identifier that is mapped to the identifier of the computing instance that has been deleted.

18. The system of claim 17, the instructions to be further executed in order to provide a reversion-limitation analysis that identifies aspects of the reversion state that differ from corresponding aspects of the initial state.

19. The system of claim 17, wherein the instruction to perform the reversion operation comprises a command to delete one or more computing instances, wherein each computing instance has an identifier.

20. The system of claim 17, the instructions to be further executed in order to:
  generate one or more clone computing instances, wherein each clone computing instance replicates a configuration of a corresponding computing instance; and
  generate a mapping that maps each clone computing instance's identifier to a computing instance's unique identifier.

* * * * *